Sept. 27, 1966  D. C. SCHLUDERBERG ETAL  3,275,521
FAST BREEDER REACTOR ARRANGEMENT
Filed Nov. 15, 1963  3 Sheets-Sheet 1

INVENTORS
Donald C. Schluderberg
Gordon R. Winders
BY
ATTORNEY

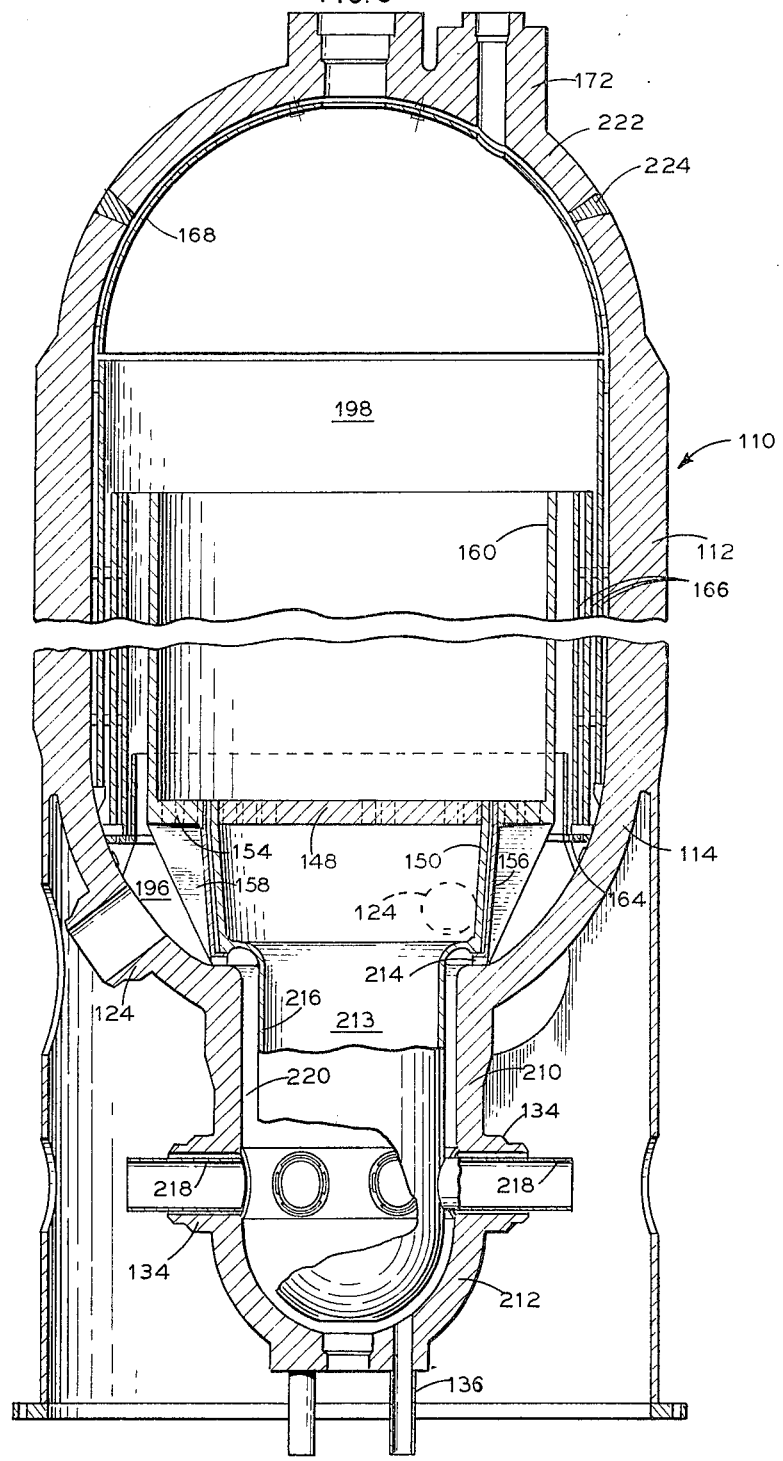

3,275,521
FAST BREEDER REACTOR ARRANGEMENT

Donald C. Schluderberg and Gordon R. Winders, Lynchburg, Va., assignors to The Babcock & Wilcox Company, New York, N.Y., a corporation of New Jersey
Filed Nov. 15, 1963, Ser. No. 324,008
16 Claims. (Cl. 176—18)

The present invention relates in general to a fast breeder nuclear reactor operable with a single phase moderating coolant fluid, or mixture of such fluids, capable of undergoing a substantial change in density with a change in heat content to variably control the chain reaction and more particularly to a reactor arrangement capable of operation by such a control method.

The present invention discloses a particular reactor arrangement operable by the method disclosed in copending application, Serial No. 261, 627, now Patent No. 3,247,068, issued April 19, 1966, wherein a fast breeder type nuclear reactor is variable moderated and controlled to regulate the chain reaction by utilizing a high pressure, high temperature hydrogen bearing vapor such as supercritical steam.

As noted in the above-identified copending application, it has been deemed impractical to operate fast reactors of the prior art using any coolant other than a liquid metal. As a consequence, various requirements relating to the reactor design and arrangement have been imposed upon the reactor designer. These requirements have been, in many instances, in the form of limitations necessary for the safe and satisfactory utilization of a liquid metal coolant, and have resulted in arrangements which introduced complications in the design, fabrication, and the maintenance of the reactors while at the same time increasingly their complexity and cost. For example, it is recognized that there is imminent probability of a violent chemical reaction if the liquid metal coolant were to contact either water or air, hence great precautions must be taken to insure that the integrity of the coolant system will be maintained. Furthermore, due to the probability that the reactor components would retain a surface film of liquid metal coolant, care must be exercised that, even after removal of the components from the system, these components do not come into contact with either water or air. Thus upon removal from the system these components, and especially spent fuel elements, must be provided with a coolant system utilizing an inert gas as the coolant medium. This adds to the complexity and cost of the reactor plant and complicates the handling and processing of these components.

A further disadvantage of fast breeder reactor arrangements of the prior art has been the requirement that, in case of a severe accident resulting in a loss of system coolant, the core of the reactor must still be submerged in the reactor coolant to properly provide for decay heat cooling. This has resulted in reactor arrangements having no penetrations of the pressure vessel below the top of the core so that, barring the failure of the pressure vessel itself, a failure in the reactor system would not drain the coolant from around the core. As a consequence, the upper portion of the reactor has been made very complicated by locating coolant inlets and outlets and the control system components in this region making accessibility of the fuel elements for repair, rearrangement, or replacement extremely difficult. This difficulty imposes an especially severe penalty in reactors of extremely high outputs, say in the range of 1000 MW Elec., as are now being contemplated. With such high capacity plants extensive down time for servicing seriously penalizes the overall economics of the system, and the more difficult and complicated the removal or replacement of the fuel elements the higher the operating and maintenance costs will be.

Another adverse feature of liquid metal cooled breeder reactors which has complicated known reactor arrangements, has been the requirement that the reactor core be arranged for upflow of the coolant through the fuel elements, in order to efficiently utilize the thermosyphonic action of the heated coolant fluid to aid in circulating the coolant through the core. In very large reactors, having a high rate of flow through the reactor core, the upward-flowing coolant has produced forces which tended to lift the fuel elements out of the core support plate. Inasmuch as any such movement of the fuel elements within the core may be dangerous, if not disastrous, extreme caution has had to be exercised to insure that the fuel elements remained properly positioned in the core support. While hold down apparatus acting from the top of the core provided the necessary stability for the fuel elements, the desirability of eliminating this complication was readily recognized.

The reactor arrangement of this invention utilizes a single phase coolant fluid such as supercritical pressure steam thereby avoiding many of the disadvantages cited for the present fast breeder reactor arrangements. First, as stated in the above noted copending application, the use of supercritical steam as the coolant fluid permits a wide range of reactor control by the variation of the density of the steam in the reactor core, thus simplifying and minimizing the need for other types of control. Second, due to the fact that there is no adverse chemical reaction when supercritical steam comes in contact with water or with air, decay heat cooling of reactor components, upon removal from the reactor, may be effected very simply by utilizing ordinary water as the cooling medium. Third, since a reactor utilizing supercritical steam will always require the forced circulation of the coolant through the reactor core to adequately provide for decay heat removal, dangers attendant on leakage of the coolant from connections in the lower portion of the vessel will not be significant, making possible the use of fluid connections through the lower portion of the reactor pressure vessel. This, of course, simplifies the upper portion of the reactor pressure vessel, making possible relatively easy accessibility to the core for routine maintenance and for replacement of fuel elements. Fourth, since the natural circulation convection head of heated supercritical steam, which acts nearly like a perfect gas, is so very small a part of the imposed coolant flow head, there is no requirement that the coolant flow be upward through the core. By utilizing forced flow supercritical steam as the coolant, the flow may be downward through the core so that there will be no forces acting on the fuel elements which would tend to lift them from a bottom support plate. As a matter of fact, all of the forces acting on the fuel elements, including both gravity and the forces occasioned by the flowing coolant will tend to maintain the fuel elements properly positioned.

Accordingly, the present invention provides a nuclear reactor comprising a pressure vessel having a plurality of fuel elements arranged as a core therein to undergo a fission-type chain reaction and having an operating neutron spectrum energy level substantially above the thermal neutron level, a plurality of elements containing a nuclear fertile material which is arranged to form a breeding blanket around the core and means which provide for passing a coolant fluid serially upward through the blanket elements laterally surrounding the core and then downwardly through the core elements.

Furthermore, the present invention provides a reactor wherein the coolant fluid is a single phase hydrogen-isotope-bearing fluid capable of a substantial change in density with a change in heat content and, specifically, supercritical steam, containing either $H_2O$ or $D_2O$ or a combination of the two, whereby the chain reaction may be controlled by the variation either of the density of the fluid or the composition of the fluid in the core.

The reactor of the present invention provides an element support grid structure arranged in the lower portion of the pressure vessel, the support being divided into at least two concentric portions with the inner portion being constructed and arranged to support the elements forming the core, and the outer portion arranged to support the elements of the blanket which laterally surround the core. The several portions of the support grid are further arranged to be independently supported by the lower head of the reactor pressure vessel in a manner to suitably provide for differential expansion between the core and the blanket support portions.

Additionally, the present arrangement includes a coolant fluid inlet extending through the lower head of the reactor pressure vessel for introducing coolant fluid into the lower end of the blanket elements laterally surrounding the core and a coolant outlet extending through the lower head of the reactor vessel communicating with the lower ends of the core elements to provide a flow path for discharge of the coolant fluid from the reactor.

Moreover, the present arrangement provides a core support portion having an upper plate and a lower plate, with a flow space therebetween, wherein the flow space is divided into a plurality of concentric flow zones, the lower plate having a multiplicity of orifices therethrough for the passage of coolant from the fuel elements to the coolant outlet, and a plurality of flow control pipes extending from the flow zones through the pressure vessel to regulate the coolant flow through the fuel elements corresponding to the zones of the grid plate.

In addition the structure of the present invention provides an arrangement whereby the upper pressure vessel head may be integrally welded to the pressure vessel to provide an integral structure.

The various features which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

Of the drawings:

FIG. 3 illustrates a modification of the reactor illustrated in FIG. 1.

Figure 1:
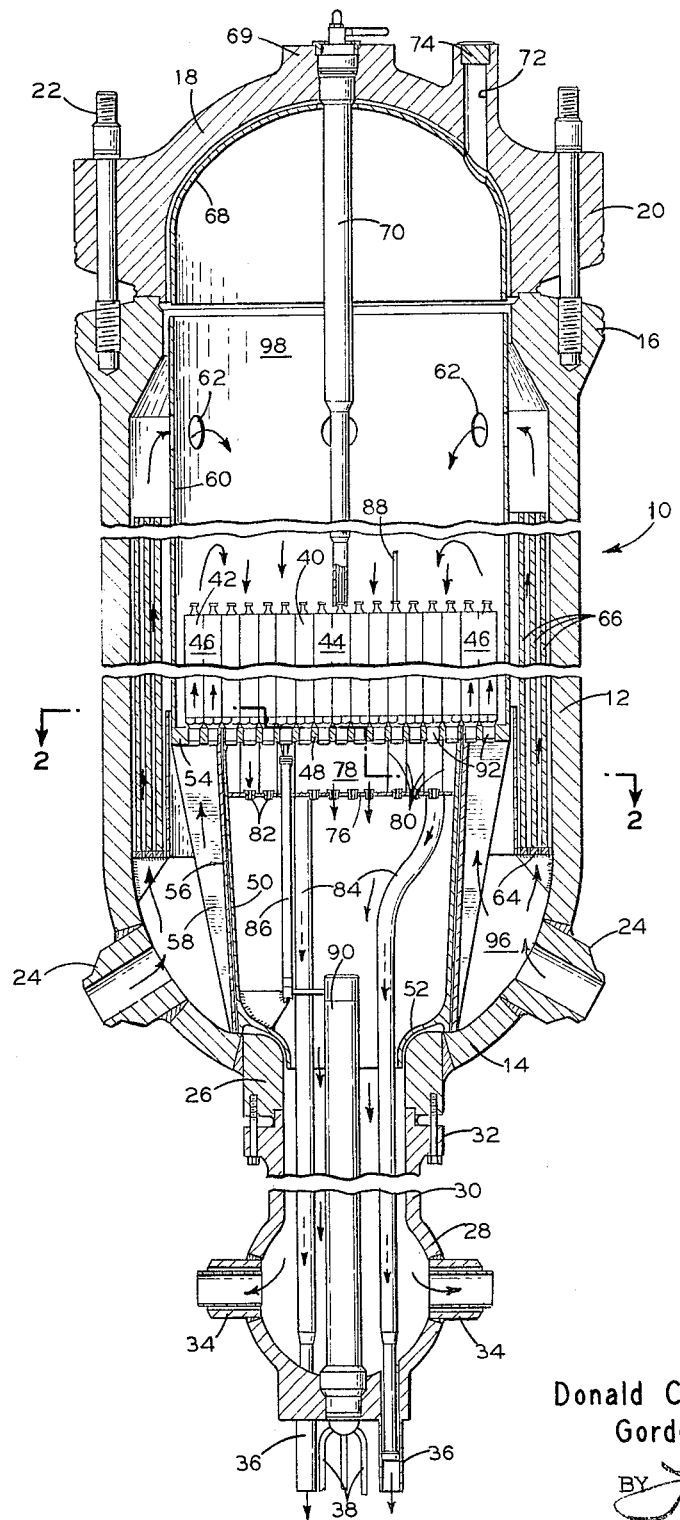
FIG. 1 illustrates a vertical section of one embodiment of the reactor arrangement of the present invention.

Referring now to FIG. 1, the specific arrangement of a steam cooled breeder reactor 10, operable as disclosed in the above-identified copending application, is illustrated. The reactor 10 of the present invention comprises a vertically elongated cylindrical pressure vessel 12, closed at the lower end by an integrally formed hemispherical lower head 14 and terminating in an open upper end which is bounded by a closure flange 16. A removable upper closure 18, having a closure flange 20 arranged to mate with flange 16, is maintained in fluid-tight relation with the open end of the pressure vessel 12 by a plurality of circumferentially disposed bolted studs 22. The lower head 14 is provided with a plurality of circumferentially spaced inlet nozzles 24 and a centrally disposed plenum nozzle 26. An outlet plenum chamber 28, connected to the lower end of an elongated cylindrical outlet extension 30, is connected through a flange joint 32 to the plenum nozzle 26. The outlet plenum chamber 28 is provided with a plurality of circumferentially spaced outlet nozzles 34 extending horizontally therefrom, a plurality of flow control nozzles 36, and safety rod actuator lines 38 which will be described later in more detail.

A support grid in the lower portion of the pressure vessel 12 supports both the core fuel elements 40 and blanket elements 42, which arranged to form the core 44 and blanket 46 of the reactor. The fuel elements are disposed, as is well known in the art, as a core capable of undergoing a self-sustaining fission-type chain reaction and having an operating neutron spectrum energy level substantially above the thermal neutron level. The support grid is divided into two independently supported sections concentric one with the other. The center core support is formed of a hexagonal core support grid plate 48 connected to and borne by a skirt member 50 which extends downwardly from the grid plate 48 and is supported at its lower end by the lower head 14 of the pressure vessel. Connected to the interior of the lower portion of the skirt member 50 is a flow transition member 52 which directs the flow of fluid from the skirt member to the centrally positioned plenum nozzle 26. While not shown, this transition member may extend into the outlet plenum 28, if desired, to form a thermal shield adjacent the walls of the plenum nozzle 26, the flange joint 32, and the outlet extension 30 to minimize thermal shock within these components. A blanket support grid 54 extends concentrically around the core grid plate 48 and is supported by a support skirt member 56 which is concentric with core skirt member 50, and extends vertically downward from the grid 54 to rest at its lower end upon the lower head 14 of the pressure vessel. If necessary, a plurality of support ribs 58 may be radially disposed around the support skirt 56 to aid in the support of the blanket support grid 54. A substantially cylindrical core tank member 60 extends upwardly from the periphery of the blanket support grid 54 to the upper portion of the pressure vessel 12. A plurality of openings 62 may be provided in the upper portion of the core tank member 60 to permit fluid flow therethrough, as will be more fully described hereinafter.

Arranged around the periphery of the core and supported at their lower extremities in the lower portion of the pressure vessel by annular support plate 64 are a plurality of concentric, spaced thermal shields 66. These shields are so placed to minimize the radiation damage and the thermal heating of the pressure vessel wall by the neutron flux and gamma radiation which emanate from the reactor core. The spacings between the shields 66 provides a flow path whereby a portion of the coolant fluid may flow therebetween, to maintain the shields and the pressure vessel 12 at the desired uniform temperature. The upper closure head 18 of the pressure vessel is provided with a spaced inner lining 68 which generally follows the inside contour of the closure head and is positioned in alignment with the core tank 60. The space between the lining and the closure head permits a portion of the coolant fluid to flow therethrough to maintain the closure head at the desired temperature.

Extending through the central portion of the closure head is a nozzle 69 through which a regulating rod drive mechanism 70 extends which is connected to and operates a regulating rod 71 (FIG. 2) disposed centrally of the reactor core. A refueling nozzle 72 is also provided in the upper closure head. This nozzle is normally sealed by a plug 74 which may be removed, upon shut down of the reactor, for the insertion of element handling apparatus associated with the maintenance, repair or replacement of the various elements within the reactor core, obviating the necessity for removal of the entire upper closure head 18.

Figure 2:
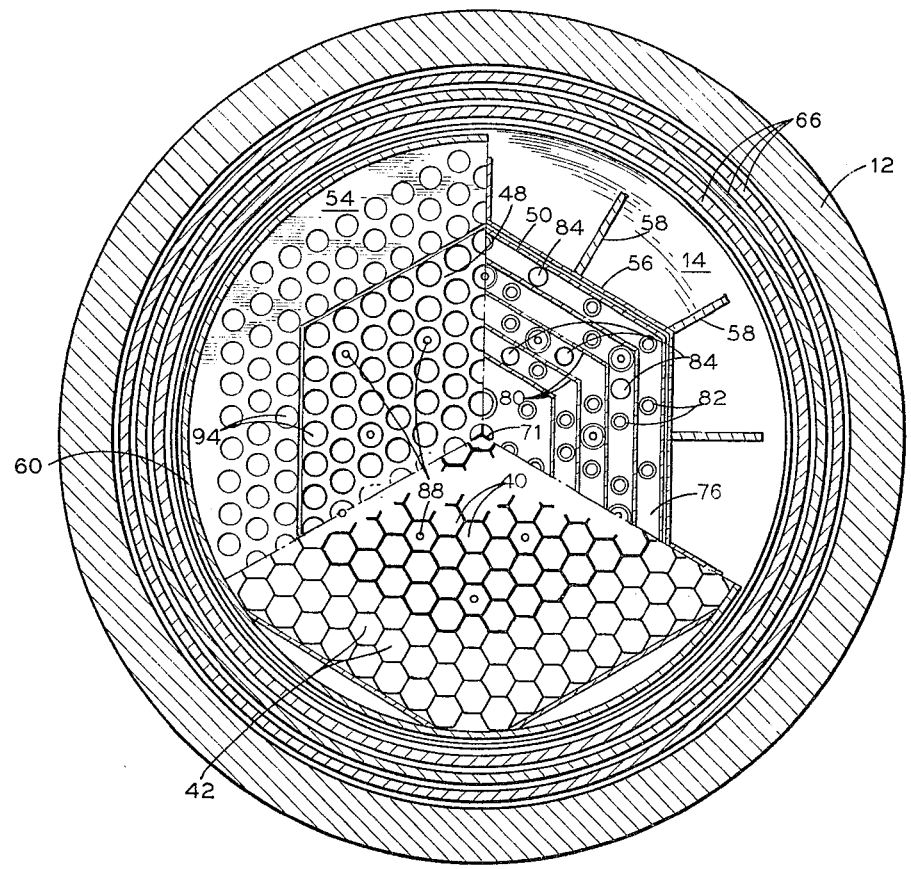
FIG. 2 illustrates a horizontal compound cross-sectional view of the reactor taken along line 2—2 of FIG. 1.

The hexagonal core support grid plate 48 is arranged with a secondary plate 76 disposed in alignment thereunderneath, forming a flow space 78 therebetween. This flow space is divided into separate flow zones by a plurality of spaced hexagonal grids 80 which are concentric with the core support grid plate 48. FIG. 2 shows five such concentric zones in the core area of the reactor. Each of the flow zones is provided with flow outlet orifices 82 extending through the secondary plate 76 which are so proportioned to permit the passage of a major portion of the coolant flow therethrough. The flow zones are also provided with a plurality of flow control pipes 84 which extend from the lower plate 76 through the lowermost portion of the outlet plenum 28, thence through the flow control nozzles 36. The operation of these flow control pipes will be further described later.

Also disposed in the lower portion of the pressure vessel are a plurality of safety rod actuators 86 connected to the lower end of safety rods 88, of a type well known in the art, which extend upwardly through selected core fuel elements. The safety rod actuators are connected through a containment 90, which extends through the lowermost portion of the outlet plenum 28, to the safety rod actuator lines 38.

It should be noted that FIG. 2 is a cross section of the reactor of the present invention, taken along line 2—2 of FIGURE 1. This line cuts through a portion of the blanket and fuel element assemblies then along the upper portion of the blanket and core support plates and then through the space between the core support plate 48 and secondary plate 76.

The fuel and blanket elements, 40 and 42 respectively, used in the present reactor are preferably of the vertically elongated pin type encased within a hexagonal container, as illustrated in a sectional portion of FIG. 2. The central fuel element of the core is arranged with a passageway therethrough to accommodate a regulating control rod 71 which is inserted or withdrawn from the reactor to provide fine adjustment of reactivity. Selected fuel elements in the core are also provided with a passageway therethrough for accommodating the safety rods 88 which are utilized only for shutting down the reactor. During normal operation these safety rods are completely removed from the core. The fuel elements are equipped, at their lower ends, with circular end adaptors 92 which fit into circular openings 94 in the core support grid plate 48. The blanket elements 42 are similarly equipped, the end adaptors in this case fitting into circular openings in the blanket support grid plate 54.

The fuel elements comprising the core of the present invention contain a fuel material such as U–235, Pu–239, U–233, or some mixture of these capable of undergoing fissioning under the influence of fast neutrons. The fuel elements may also contain a fuel and a fertile material, such as U–238 or Th–232 mixed with the fuel material, capable of absorbing excess neutrons to form Pu–239 or U–233. The blanket elements 42 initially contain the fertile material with the possibility of an additional initial concentration of fissionable material such as in depleted or natural uranium. As the blanket is subjected to neutron irradiation, resulting from the chain reaction maintained within the core volume during reactor operation, the fertile material is converted to fissionable material, a portion of which will beneficially contribute to the chain reaction during the operation of the reactor, while the remainder of which may be reclaimed after removal of the blanket elements from the reactor. Approximately the top and bottom 18 inches of the elements forming the core are filled with the same material as are the blanket elements, rather than with fuel material, thus forming a top and bottom blanket for the core.

The operation of the present reactor is substantially as described in the above-identified copending application. In particular, the coolant and moderator fluid which, for example, may be steam, is introduced into the reactor through inlet nozzles 24. This steam is circulated through the reactor until the reactor reaches the operating temperature. The safety rods are removed one by one in a safe procedure involving the operation of the regulating rod while steam density is sufficiently low so that criticality is not achieved until all of the safety rods have been removed and the density of the coolant-moderator has been subsequently raised. To reach criticality the pressure and density of the coolant steam is slowly increased. Final adjustment of steam pressure and temperature to correspond to the desired operating conditions is accomplished by the variation of the $D_2O/H_2O$ ratio in the coolant and by positioning of the regulating rod. Throughout the life of the reactor, reactivity is controlled either by variation in the density of the coolant-moderator steam flowing within the reactor, by a variation in the composition of the coolant fluid i.e., variation of the $H_2O/D_2O$ ratio, and/or by adjustment of the regulating rod 71 to compensate for fuel burn-up, fission product poison accumulation and/or variation in the power output requirements of the reactor. The reactor may be shut down either by inserting the safety rods or by reducing the density of the coolant-moderator fluid to the point where it is no longer possible to sustain the chain reaction.

Reactor coolant-moderator fluid is introduced through the inlet nozzles 24 into the annular flow space 96 formed between the pressure vessel wall and the support skirt 56. Approximately one-quarter of the coolant then passes upwardly through the blanket support plate 54 and thence through the blanket elements 42 to the upper plenum chamber 98 as generally indicated by the arrows in FIG. 1. The remaining three-quarters of the coolant introduced through the inlet nozzles passes upwardly through the spaces between the thermal shields 66 spaced outside of the core tank member 60 to the upper portion of the reactor pressure vessel where it also enters the upper plenum chamber 98 through openings 62 in the core tank member. The core tank member prevents the coolant from diffusing through the blanket and core elements as it flows upwardly through the thermal shielding. A very small amount of this latter portion of the coolant fluid also circulates in the space between the upper closure head 18 and the upper liner 68 to maintain the temperature of the closure head at the desired value. The two portions of the coolant discharging from the thermal shields and the blanket elements mix in the upper plenum chamber 98 and then flow downwardly through the core fuel elements 40, absorbing heat from the elements in the passage therethrough. It then flows through the core support grid plate 48 to the outlet plenum chamber 28 and out through outlet nozzles 34 to a point of use, not shown.

As noted above, the concentrically arranged flow areas for accommodating coolant flow are provided by the secondary plate 76 and the cooperating spaced hexagonal grids 80 disposed beneath the core support plate 48. The major portion of the coolant passes through the outlet orifices 82 to discharge directly into the outlet plenum 28. However, a portion of the coolant flow is passed through flow control pipes 84 connected to each flow zone. These flow control pipes are valved exterior of the reactor to permit regulation of flow rates through each pipe. Regulation of flow through the control pipes varies the pressure drop across orifices 82 and thereby regulates flow through the fuel elements. It is, therefore, possible to control the coolant outlet temperature in each flow zone. This provides a means for reducing coolant outlet temperature leaving the outer zones of the core to compensate for steeper radial power gradients at these locations and their adverse effects upon fuel clad temperature, for adjusting flow rates to accommodate shifts of radial power distribution and gradients during life time, and adjustment for differences between calculated and actual radial power profiles at beginning of core life.

The utilization of the foregoing flow control piping assures control of the coolant temperature leaving all of the flow zones. This result has not heretofore been easily attained due to the difficulty in correlating the variation in heat generation in the various zones within the core with regulation of cooling flow rates through the various zones of the reactor. Furthermore, the use of this control arrangement simplifies the internal arrangement of the reactor by eliminating the variable orifices within the reactor core as used in the prior art for controlling flow. It will also be noted that this flow control arrangement is desirably fail-safe, since only a small amount of the core coolant flows within the control piping so no great damage will occur to the reactor core should the valves in the control piping fail to respond.

With the use of the variable density coolant-moderator fluid, if some disturbance within the reactor should cause the reactivity of a certain portion of the core to increase, the temperature of the coolant-moderator in that portion of the core would also increase, with a consequent decrease in coolant density, in the neutron moderation and in the reactivity, thereby reducing the power density in that region. Additionally, due to the relatively low temperature of the coolant-moderator entering the core, with downward flow of the coolant-moderator through the core, the density at the top of the core will be greater, resulting in higher neutron moderation, advantageously displacing the power density curve of the core toward the top or inlet end. Moreover, since the temperature differential existing between the fuel elements and the coolant-moderator fluid at the inlet end is thus increased, higher heat removal rates will be possible. For a more comprehensive discussion and disclosure of the method of variably controlling a reactor utilizing a variable density coolant-moderator fluid, reference should be had to the above-identified copending application.

Table I sets forth design details of the reactor of the present invention and where two figures are shown, they apply respectively to a closed heat transfer cycle wherein the heat from the reactor coolant-moderator fluid is transferred to a secondary heat transport fluid for use in the steam turbine and the reactor coolant-moderator fluid is circulated within a closed system, and an open heat transfer cycle wherein the reactor coolant-moderator fluid is utilized directly in a steam turbine.

*Table 1*

| | |
|---|---|
| Reactor power _____MW heat__ | 2326 |
| Net station output _____MW(e)__ | 1000/1040 |
| ($\eta=43\%/44.8\%$) | |
| Turbine throttle pressure _____p.s.i.a___ | 2400/3400 |
| Turbine throttle temperature _____° F__ | 1000/1050 |
| $PuO_2$ loading (initial) _____kg__ | 2300 |
| $PuO_2+UO_2$ loading (initial) _____kg__ | 22,000 |
| Reactor coolant _____ | Steam |
| Coolant flow _____lb./hr__ | 23,540,000 |
| Reactor coolant inlet temperature ____° F__ | 756 |
| Reactor coolant inlet pressure _____p.s.i.a__ | 3650 |
| Reactor coolant outlet temperature ___° F__ | 1050 |
| Reactor coolant outlet pressure ____p.s.i.a__ | 3475 |
| Maximum clad surface temperature ___° F__ | 1350 |
| Coolant pressure drop in blanket (with partial flow by-pass _____p.s.i__ | 20 |
| In core _____p.s.i__ | 155 |
| Core life _____days__ | 480 |
| Average fuel irradiation _____mwd./t__ | 50,000 |
| Initial breeding ratio _____ | 1.14 |
| Average core heat flux _____$B.t.u./ft.^2/hr$__ | 282,386 |
| Average core power density _____kw./l__ | 352.0 |
| Average cell power density _____kw./l__ | 389.0 |
| Number fuel pins _____ | 79,544 |
| Number core bundles _____ | 127 |
| Reactor pressure vessel I.D. _____inches__ | 144 |
| Core diameter _____do____ | 76.0 |
| Core height _____do____ | 84.0 |
| Blanket thickness, sides _____do____ | 17.0 |
| Blanket thickness: top and bottom ___do____ | 18.0 |
| Core fuel pin spacing (triangular) __do____ | 0.250 |
| Core fuel pin O.D. _____do____ | 0.185 |
| Core fuel pin I.D. _____do____ | 0.167 |
| Core fuel pin clad thickness _____do____ | 0.009 |
| Core fuel pin clad material stainless steel type _____dl./Incoloy__ | 19–9 |
| Side blanket pin spacing (triangular) __inch__ | 0.554 |
| Side blanket pin O.D. _____do____ | 0.500 |
| Side blanket pin clad thickness _____do____ | 0.017 |
| Blanket pin clad material _____dl__ | 19–9 |
| Number blanket pins _____ | 17,526 |
| Number blanket bundles _____ | 138 |

An alternate embodiment of the present invention is illustrated in FIGURE 3, wherein similar components corresponding to those illustrated in FIGURE 1 have been given the same reference number with the prefix 1 added. In this arrangement the plenum nozzle (26 in FIG. 1) of the pressure vessel lower head 114 is replaced by a cylindrical member 210 which is integrally attached to the lower head of the pressure vessel, concentric therewith, and extending downwardly therefrom to terminate in a lower generally hemispherical head 212 forming outlet plenum 213. Outlet nozzles 134 and flow control nozzles 136 are provided through the lower portion of this cylindrical member.

The blanket support skirt member 156 in this embodiment rests upon the lower head 114 of the pressure vessel with flow channel openings 214 provided at suitable intervals through the lowermost portion of the support skirt. The core support skirt member 150 rests on the lowermost portion of the blanket support skirt member 156 and has a cylindrical extension 216 projecting within the cylindrical member 210 to form an outlet passage for the coolant leaving the reactor core through the core support grid plate 148. The cylindrical extension 216 is provided with outlet sleeves 218 which are aligned and extend concentrically within outlet nozzles 134. In this arrangement, the necessity of an elongated cylindrical extension (e.g. reference number 30 in FIG. 1) for the outlet plenum is eliminated. The purpose of this extension in the embodiment illustrated in FIG. 1 is to accommodate the temperature gradient encountered between the outlet plenum chamber, which is operated at nearly the outlet temperature of the reactor coolant, and the lower pressure vessel head, which is operated at substantially the temperature of the inlet coolant. In the alternate arrangement illustrated in FIGURE 3, the thermal gradient existing between the outlet plenum 213 and the lower pressure vessel lower head 114 is transferred to the outlet lines (not shown) which are connected to outlet nozzles 134. This is accomplished by passing a small portion of the inlet coolant, entering nozzles 124 into the annular chamber 196, through flow channel openings 214 at the bottom of the blanket support skirt, into the annular space 220 between the cylindrical member 210 and the cylindrical extension 216. Since this coolant is at the inlet temperature it maintains the cylindrical member 210 substantially at the fluid inlet temperature, insulating it from the high temperature fluid within the cylindrical extension 216. This portion of the inlet coolant fluid then flows in the annulus between the outlet nozzles 134 and the outlet sleeves 218 to a point removed from the pressure vessel where it then may be mixed with the outlet coolant. Since the amount of inlet coolant fluid utilized for this purpose is quite small, as compared to the outlet coolant flow, its effect on the outlet coolant temperature is insignificant. With this arrangement the thermal gradient problem is overcome without the necessity of an elongated extension member, thus resulting in a lower overall reactor height.

The core and internal structure when using this arrangement is substantially like that illustrated in FIG. 1, the only exception being that now the core tank member 160 is not aligned with the inner lining 168 of the upper closure head 222. The inner lining 168 of the closure head of this arrangement is aligned with the outermost thermal shield 166, and still functioning in the same manner as that described with the first disclosed embodiment.

A major distinction of the alternate arrangement illustrated in FIGURE 3 over that illustrated in FIGURE 1 is the elimination of the bolted flanged closure head 18. It has been found that, by using internal element handling apparatus through nozzles in the upper head of the reactor vessel, it is possible to rearrange or remove any of the reactor internals through these nozzles without removing the closure head. The only exceptions are the blanket and core supports and the thermal shield. The present arrangement thus utilizes an upper closure head 222 which is integrally welded at 224 to the pressure vessel 112, thereby reducing the overall size of the components required, with substantial economies in material and fabrication. This welded closure arrangement is possible both because of the demonstrated practicality of through head component handling and because the equipment normally used for start-up can be easily adapted to circulate steam or gas through the vessel at stress relieving temperatures. Thus it is possible to remove and then subsequently replace the upper head of the pressure vessel, stress relieving the vessel-head weldment 224 by circulating reactor coolant fluid or a gas at the requisite temperature through the reactor for the desired length of time before power producing operation is initiated. Heretofore this has not been feasible due to the fact that coolant operating temperatures were not high enough to come within the temperature range required to provide for relief of residual stresses incurred during the welding process, or the cooling and the system design made the arrangement impractical.

This particular closure arrangement embodies many advantages over the bolted flanged closure of prior art reactors. Among these advantages are a lower first cost, since heavy flanged members, studs and bolts, seals and auxiliary equipment are no longer required. In addition, the rate at which the reactor and its containment vessel may safely be brought to on-stream power output is significantly increased since there now are no heavy bolted flanged members whose temperatures have always tended to lag behind that of the remainder of the pressure vessel. Maintenance on the pressure vessel closure is also greatly reduced since there are no studs and bolts or seals to recondition after each closure head removal.

In addition, the entire pressure vessel may be uniformly stress relieved in situ by the stress relieving procedure noted above which provides the additional advantage that, after a long period of operation, the entire reactor vessel may be stress relieved, removing the major portion of the accumulated stress caused by neutron irradiation.

In the present invention, when utilizing supercritical steam as both the moderator and the coolant it is both feasible and practical to locate both the coolant inlets and outlets in the lower portion of the pressure vessel, since the unusually favorable heat transport characteristics of supercritical steam are such that the fluid flow mass for a given power output, as well as the supply and discharge piping requirements can be readily provided through a single head of the reactor vessel and/or the adjacent vessel wall. Furthermore, with this coolant-moderator forced circulation system, it is possible to place both the inlet and outlet coolant connections in the lower portion of the reactor vessel since the necessity of preventing drainage of the coolant from the core in case of an accident, as apply to liquid cooled reactors, are not applicable.

As previously noted, in fast breeder reactors of the prior art the coefficient of reactivity both of fuel temperature and coolant density have been so small that the reactivity of the reactor could be seriously modified by small changes in core geometry. These changes might result from slight movements of the fuel elements due to differential thermal expansion or from displacement of the fuel elements due to forces induced by the flow of coolant therethrough. As a result, complicated and expensive fuel element support and hold-down apparatus has been required in prior art arrangements. However, in the present invention, by using steam or some other hydrogen bearing coolant, the coefficients of reactivity more nearly approach those for present day thermal reactors so that moderate changes in core geometry will not seriously affect the overall core reactivity. This results in simpler, more economical core internal arrangements and, in combination with down-flow of the coolant through the core simplifies the upper core hold-down and alignment arrangements.

An additional advantage of the present arrangement is that by incorporating the large upper plenum chamber 98 or 198 in the reactor, sufficient access space is made available to readily permit refueling of the reactor through the upper closure head, thus reducing the reactor down-time required for such refueling, with consequent improvement in plant economics. It will be recognized that this same access feature lends itself equally well to the replacement or relocation of certain fuel elements within the core.

The present arrangement also provides independent separate grid support members for both the blanket and the core areas, thus minimizing temperature differential problems that might result from the two-pass arrangement for coolant flow, which has the cool inlet fluid passing through the blanket support grid and the hot exit fluid passing through the core support grid.

It is to be further noted that, since only relatively cool inlet fluid passes through the blanket elements, cladding requirements of these elements is minimized with a resultant increase in fuel breeding efficiencies. Furthermore, since a major portion of the incoming coolant fluid passes through the thermal shields, overall pressure drop through the reactor is minimized over that which would result were it necessary to have all of the inlet coolant flow through the banket elements. This also simplifies the arrangement of the present reactor by reducing the pressure drop across the blanket elements so that the force produced by the flowing coolant, which would tend to lift the blanket elements from their support grid, are significantly lower than the weight of the elements themselves, so that no additional hold-down arrangements are required for the blanket elements. It should be further noted that the reactivity changes mentioned above with respect to the core elements do not apply to the blanket elements.

In prior breeder reactor arrangements difficulty has been encountered in apportioning and controlling the coolant flow through the blanket elements. This flow control has been necessary due to the fact that relatively little heat is produced in the blanket at the beginning of core life but an increasingly larger percentage of heat is produced therein as the core is operated due to the accumulation of bred fuel material within the blanket elements. To pass the entire amount of coolant through the blanket elements at the beginning of core life, in anticipation of satisfactorily accommodating the amount of heat to be produced later, only results in a lowering of the final coolant outlet temperature from the reactor at the start of core life. Thus it has been deemed both desirable and necessary to regulate the flow of the coolant through the blanket throughout the core life span. This requirement is obviated in the present reactor arrangement since only a small portion of the coolant passes through the blanket elements, with the remainder flowing through the thermal shields surrounding the core and blanket. The divided flow is made possible in the present arrangement by the mixing of the coolant discharging from the thermal shields and the coolant discharging from the blanket elements in the upper plenum chamber before it enters the core elements. This assures that the temperature of the coolant mixture entering the core elements is substantially uniform across the core fuel element inlets.

It should also be noted that with the utilization of down-flow through the core elements the coolant fluid assists and assures the insertion of the safety rods when necessary, as contrasted to an arrangement wherein an upward coolant flow would tend to resist and hinder the insertion of the safety rods making the reactor arrangement even more complicated.

The entire reactor arrangement in the present invention makes possible a breeder reactor which is relatively simple in its arrangement resulting in fabrication, operating and maintenance economies not heretofore achieved or contemplated.

While in accordance with the provisions of the statutes there is illustrated and described herein a specific embodiment of the invention, those skilled in the art will understand that changes may be made in the form of the invention covered by the claims, and that certain features of the invention may sometimes be used to advantage without a corresponding use of the other features.

What is claimed is:

1. A nuclear reactor comprising a pressure vessel having a plurality of fuel elements arranged as a core therein to undergo a fission-type chain reaction and having an operating neutron spectrum energy level substantially above the thermal neutron level, a plurality of elements containing fertile material arranged as a blanket surrounding said core, and means for passing a coolant fluid serially upward through the blanket elements laterally surrounding said core and then downwardly through said core elements.

2. A nuclear reactor comprising a pressure vessel having a plurality of fuel elements arranged as a core therein to undergo a fission-type chain reaction and having an operating neutron spectrum energy level substantially above the thermal neutron level, a plurality of elements containing fertile material arranged as a blanket surrounding said core, means for passing a coolant fluid serially upward through the blanket elements laterally surrounding said core and then downwardly through said core elements, and an element support arranged in the lower portion of said pressure vessel, said support being divided into at least two concentric portions, the inner portion constructed and arranged to support the elements forming said core and the outer portion constructed and arranged to support the elements of said blanket laterally surrounding said core.

3. A nuclear reactor comprising a pressure vessel having upper and lower heads, a plurality of fuel elements arranged within said pressure vessels as a core to undergo a fission-type chain reaction and having an operating neutron spectrum energy level substantially above the thermal neutron level, a plurality of elements containing fertile material arranged as a blanket surrounding said core, means for passing a coolant fluid serially upward through the blanket elements laterally surrounding said core and downwardly through said core elements, and an element support arranged in the lower portion of said pressure vessel, said support being divided into at least two concentric portions, the inner portion constructed and arranged to support the elements forming said core and the outer portion constructed and arranged to support the elements of said blanket laterally surrounding said core, said portions of said support being independently supported by the lower head of said reactor vessel to provide for differential expansion between said core and said blanket support portions.

4. A nuclear reactor comprising a pressure vessel having upper and lower heads, a plurality of fuel elements arranged within said pressure vessel as a core to undergo a fission-type chain reaction and having an operating neutron spectrum energy level substantially above the thermal neutron level, a plurality of elements containing fertile material arranged as a blanket surrounding said core, means for passing a coolant fluid serially upward through the blanket elements laterally surrounding said core and then downwardly through said core elements, a coolant fluid inlet extending through the lower head of said pressure vessel for introducing said coolant fluid into the lower end of the blanket elements laterally surrounding said core, and a coolant fluid outlet extending through the lower head of said pressure vessel and communicating with the lower ends of said core elements to remove coolant fluid therefrom.

5. A nuclear reactor comprising a pressure vessel having upper and lower heads, a plurality of fuel elements arranged within said pressure vessel as a core to undergo a fission-type chain reaction and having an operating neutron spectrum energy level substantially above the thermal neutron level, a plurality of elements containing fertile material arranged as a blanket surrounding said core, means for passing a coolant fluid serially upward through the blanket elements laterally surrounding said core and then downwardly through said core elements, an element support arranged in the lower portion of said pressure vessel, said support being divided into at least two concentric portions, the inner portion constructed and arranged to support the elements forming said core and the outer portion constructed and arranged to support the elements of said blanket laterally surrounding said core, said core support being supported by a tubular member from the lower head of said pressure vessel, a coolant fluid inlet extending through the lower head of said pressure vessel for introducing said coolant fluid into the lower end of the blanket elements laterally surrounding said core, and a coolant fluid outlet disposed in the lower head of said pressure vessel and communicating with the lower ends of said core elements to remove coolant fluid therefrom through said core support tubular member.

6. A nuclear reactor comprising a pressure vessel having upper and lower heads, a plurality of fuel elements arranged within said pressure vessel as a core to undergo a fission-type chain reaction and having an operating neutron spectrum energy level substantially above the thermal neutron level, a plurality of elements containing fertile material arranged as a blanket surrounding said core, means for passing a coolant fluid serially upward through the blanket elements laterally surrounding said core and then downwardly through said core elements, an element support arranged in the lower portion of said pressure vessel, said support being divided into at least two concentric portions, the inner portion constructed and arranged to support the elements forming said core and the outer portion constructed and arranged to support the elements of said blanket laterally surrounding said core, a coolant fluid outlet extending through the lower head of said pressure vessel and communicating with the lower ends of said core elements to remove coolant fluid therefrom, said core support portion comprising upper and lower plate means with said fuel elements being supported in said upper plate, the space between said upper plate and said lower plate being divided into a plurality of concentric flow zones, said lower plate having a multiplicity of orifices for the passage of said coolant fluid from said fuel elements to said coolant outlet, and a plurality of flow control pipes extending from said flow zones through the lower pressure vessel head arranged to regulate the flow of coolant fluid through the fuel elements corresponding to the zones in said support plate.

7. A nuclear reactor comprising a pressure vessel having upper and lower heads, a plurality of fuel elements arranged within said pressure vessel as a core to undergo a fission-type chain reaction and having an operating neutron spectrum energy level substantially above the thermal neutron level, a plurality of elements containing fertile material arranged as a blanket surrounding said core, means for passing a coolant fluid serially upward through the blanket elements laterally surrounding said core and then downwardly through said core elements, an element support arranged in the lower portion of said pressure vessel, said support being divided into at least two concentric portions, the inner portion constructed and arranged to support the elements forming said core and the outer portion constructed and arranged to support the elements of said blanket laterally surrounding said core, a coolant fluid outlet extending through the lower head of said pressure vessel and communicating with the lower ends of said core elements to remove coolant fluid therefrom, and said core support portion comprising upper and lower plate means with said fuel elements being supported in said upper plate, the space between said upper plate and said lower plate being divided into a plurality of concentric flow zones, said lower plate having a multiplicity of orifices for the passage of the major portion of said coolant fluid therethrough from said fuel elements to said coolant outlet, and a plurality of flow control pipes extending from said flow zones through the lower pressure vessel head, and flow control means in said pipes exterior of said pressure vessel arranged to regulate the flow of coolant fluid through the fuel elements corresponding to the zones in said support plate to maintain the outlet temperature of said coolant substantially constant throughout the reactor core cross-section.

8. A nuclear reactor comprising a vertically elongated cylindrical pressure vessel having upper and lower heads and including a plurality of fuel elements arranged as a core therein to undergo a fission-type chain reaction and having an operating neutron spectrum energy level substantially above the thermal neutron level, a plurality of elements containing fertile material arranged as a blanket surrounding said core, and means for passing a coolant fluid serially upward through the blanket elements laterally surrounding said core and then downwardly through said core elements, said upper and lower closure heads being integrally joined to said pressure vessel by strength welds.

9. A nuclear reactor comprising a vertically elongated cylindrical pressure vessel having upper and lower heads and operating at a pressure above 2000 p.s.i. and a temperature above 700° F., a plurality of fuel elements arranged as a core within said pressure vessel to undergo a fission-type chain reaction and having an operating neutron spectrum energy level substantially above the thermal neutron level, a plurality of elements containing fertile material arranged as a blanket surrounding said core, and means for passing a coolant fluid serially upward through the blanket elements laterally surrounding said core and then downwardly through said core elements, said upper and lower heads being integrally joined to said pressure vessel by strength welds.

10. A nuclear reactor comprising a vertically elongated cylindrical pressure vessel having upper and lower heads, a plurality of fuel elements arranged within said pressure vessel as a core to undergo a fission-type chain reaction and having an operating neutron spectrum energy level substantially above the thermal neutron level, a plurality of elements containing fertile material arranged as a blanket laterally surrounding said core, an element support plate means arranged in the lower portion of said pressure vessel, said support plate means being divided into at least two concentric portions, the inner portion constructed and arranged to support the elements forming said core and the outer portion constructed and arranged to support the elements of said blanket laterally surrounding said core, an outlet nozzle extending centrally through the lower head of said pressure vessel, conduit forming means extending from the said core support plate means into said outlet nozzle, an inlet nozzle extending through the lower portion of said pressure vessel and communicating with the space formed between said pressure vessel and said conduit forming means, said core portion of said support plate means comprising an upper and lower plate means, said fuel elements supported in said upper plate, means disposed in the space between said upper plate and said lower plate of said core support plate means to divide the space into a plurality of concentric flow zones, said lower plate having a multiplicity of orifices therethrough, a plurality of flow control pipes extending from said flow zones through the lower portion of said pressure vessel, means for introducing a coolant and moderator fluid through said inlet nozzle into said space between said conduit forming means and said pressure vessel for passage upwardly through said blanket elements and then downwardly through said core elements and said core support plate means, a major portion of said coolant and moderator fluid passing through said orifices and then through said conduit forming means to said outlet nozzle, a minor portion of said coolant and moderator fluid passing through said flow control pipes, flow control means in said control pipes exterior of said pressure vessel arranged to regulate the flow of coolant and moderator fluid through the fuel elements corresponding to the zones in said support plate to maintain the outlet temperature of said fluid substantially constant throughout the reactor core cross-section, and means for varying the density of said coolant and moderator fluid in said pressure vessel to control reactivity and fertile material absorption by varying the neutron spectrum in the reactor and the leakage of neutrons from the reactor.

11. A nuclear reactor comprising a vertically elongated cylindrical pressure vessel having upper and lower heads, a plurality of fuel elements arranged within said pressure vessel as a core to undergo a fission-type chain reaction and having an operating neutron spectrum energy level substantially above the thermal neutron level, a plurality of elements containing fertile material arranged as a blanket laterally surrounding said core, an element support plate means arranged in the lower portion of said pressure vessel, said support plate means being divided into at least two concentric portions, the inner portion constructed and arranged to support the elements forming said core and the outer portion constructed and arranged to support the elements of said blanket laterally surrounding said core, a cylindrical core support skirt extending upwardly from said lower head and integrally connected at its upper end to the outer periphery of said core support plate means, a cylindrical blanket support skirt extending upwardly from said lower head concentric with said core support skirt and integrally connected at its upper end to the inner periphery of said blanket support plate means, an outlet nozzle extending centrally through the lower head of said pressure vessel, conduit forming means extending from the lower end of said core support skirt into said outlet nozzle, an inlet nozzle extending through the lower portion of said pressure vessel and communicating with the space formed between said pressure vessel and said blanket support skirt, said core portion of said support plate means comprising an upper and lower plate means, said fuel elements supported in said upper plate, means disposed in the space between said upper plate and said lower plate of said core support plate means to divide the space into a plurality of concentric flow zones, said lower plate having a multiplicity of orifices therethrough, a plurality of flow control pipes extending from said flow zones through the lower pressure vessel head, means for introducing a coolant and moderator fluid through said inlet nozzle into said space between said blanket support skirt and said pressure vessel for passage upwardly through said blanket elements and then downwardly through said core elements and said core support plate means, a major portion of said coolant and moderator fluid passing through said orifices and then through said conduit forming means to said outlet nozzle, a minor portion of said coolant and moderator fluid passing through said flow control pipes, flow control means in said control pipes exterior of said pressure vessel arranged to regulate the flow of coolant and moderator fluid through the fuel elements corresponding to the zones in said support plate to maintain the outlet temperature of said fluid substantially constant throughout the reactor core cross-section, and means for varying the density of said coolant and moderator fluid in said pressure vessel to control reactivity and fertile material absorption by varying the neutron spectrum in the reactor and the leakage of neutrons from the reactor.

12. A nuclear reactor comprising a vertically elongated cylindrical pressure vessel having upper and lower heads, a plurality of fuel elements arranged within said pressure vessel as a core to undergo a fission-type chain reaction and having an operating neutron spectrum energy level substantially above the thermal neutron level, a plurality of elements containing fertile material arranged as a blanket laterally surrounding said core, the upper and lower ends of said elements forming said core containing fertile material to form an upper and lower blanket for said core, an element support plate means arranged in the lower portion of said pressure vessel, said support plate means being divided into at least two concentric portions, the inner portion constructed and arranged to support the elements forming said core and the outer portion constructed and arranged to support the elements of said blanket laterally surrounding said core, a cylindrical core support skirt extending upwardly from said lower head and integrally connected at its upper end to the outer periphery of said core support plate means, a cylindrical blanket support skirt extending upwardly from said lower head concentric with said core support skirt and integrally connected at its upper end to the inner periphery of said blanket support plate means, an outlet nozzle extending centrally through the lower head of said pressure vessel, conduit forming means extending from the lower end of said core support skirt into said outlet nozzle, an inlet nozzle extending through the lower portion of said pressure vessel and communicating with the space formed between said pressure vessel and said blanket support skirt, said core portion of said support plate means comprising an upper and lower plate means, said fuel elements supported in said upper plate, means disposed in the space between said upper plate and said lower plate of said core support plate means to divide the space into a plurality of concentric flow zones, said lower plate having a multiplicity of orifices therethrough, a plurality of flow control pipes extending from said flow zones through the lower pressure vessel head, means for introducing coolant and moderator steam through said inlet nozzle into said space between said blanket support skirt and said pressure vessel for passage upwardly through said blanket elements and then downwardly through said core elements and said core support plate means, a major portion of said coolant and moderator steam passing through said orifices and then through said conduit forming means to said outlet nozzle, a minor portion of said coolant and moderator steam passing through said flow control pipes, flow control means in said control pipes exterior of said pressure vessel arranged to regulate the flow of coolant and moderator steam through the fuel elements corresponding to the zones in said support plate to maintain the outlet temperature of said steam substantially constant throughout the reactor core cross-section, and means for varying the density of said coolant and moderator steam in said pressure vessel to control reactivity and fertile material absorption by varying the neutron spectrum in the reactor and the leakage of neutrons from the reactor.

13. A nuclear reactor comprising a vertically elongated cylindrical pressure vessel having upper and lower heads, a plurality of fuel elements arranged within said pressure vessel as a core to undergo a fission-type chain reaction and having an operating neutron spectrum energy level substantially above the thermal neutron level, a plurality of elements containing fertile material arranged as a blanket laterally surrounding said core, the upper and lower ends of said elements forming said core containing fertile material to form an upper and lower blanket for said core, an element support plate means arranged in the lower portion of said pressure vessel, said support plate means being divided into at least two concentric portions, the inner portion constructed and arranged to support the elements forming said core and the outer portion constructed and arranged to support the elements of said blanket laterally surrounding said core, a cylindrical core support skirt extending upwardly from said lower head and integrally connected at its upper end to the outer periphery of said core support plate means, a cylindrical blanket support skirt extending upwardly from said lower head concentric with said core support skirt and integrally connected at its upper end to the inner periphery of said blanket support plate means, an outlet nozzle extending centrally through the lower head of said pressure vessel, conduit forming means extending from the lower end of said core support skirt into said outlet nozzle, an inlet nozzle extending through the lower portion of said pressure vessel and communicating with the space formed between said pressure vessel and said blanket support skirt, said core portion of said support plate means comprising an upper and lower plate means, said fuel elements supported in said upper plate, means disposed in the space between said upper plate and said lower plate of said core support plate means to divide the space into a plurality of concentric flow zones, said lower plate having a multiplicity of orifices therethrough, a plurality of flow control pipes extending from said flow zones through the lower pressure vessel head, a plurality of plate means disposed between said blanket elements and said pressure vessel to form a thermal shield arrangement, means for introducing supercritical coolant and moderator steam through said inlet nozzle into said space between said blanket support skirt and said pressure vessel for passage upwardly through said blanket elements and said thermal shields and then downwardly through said core elements and said core support plate means, a major portion of said coolant and moderator steam passing through said orifices and then through said conduit forming means to said outlet nozzle, a minor portion of said coolant and moderator steam passing through said flow control pipes, flow control means in said control pipes exterior of said pressure vessel arranged to regulate the flow of coolant and moderator steam through the fuel elements corresponding to the zones in said support plate to maintain the outlet temperature of said steam substantially constant throughout the reactor core cross-section, and means for varying the density of said supercritical coolant and moderator steam in said pressure vessel to control reactivity and fertile material absorption by varying the neutron spectrum in the reactor and the leakage of neutrons from the reactor.

14. A nuclear reactor comprising a vertically elongated cylindrical pressure vessel having upper and lower heads, said upper and lower heads integrally joined to said pressure vessel by a strength weld, a plurality of fuel elements arranged within said pressure vessel as a core to undergo a fission-type chain reaction and having an operating neutron spectrum energy level substantially above the thermal neutron level, a plurality of elements containing fertile material arranged as a blanket laterally surrounding said core, the upper and lower ends of said elements forming said core containing fertile material to form an upper and lower blanket for said core, an element support plate means arranged in the lower portion of said pressure vessel, said support plate means being divided into at least two concentric portions, the inner portion constructed and arranged to support the elements forming said core and the outer portion constructed and arranged to support the elements of said blanket laterally surrounding said core, a cylindrical core support skirt extending upwardly from said lower head and integrally connected at its upper end to the outer periphery of said core support plate means, a cylindrical blanket support skirt extending upwardly from said lower head concentric with said core support skirt and integrally connected at its upper end to the inner periphery of said blanket support plate means, an outlet nozzle extending centrally through the lower head of said pressure vessel, conduit forming means extending from the lower end of said core support skirt into said outlet nozzle, an inlet nozzle extending through the lower portion of said pressure vessel and communicating with the space formed between said pressure vessel and said blanket support skirt, said core portion of said support plate means comprising an upper and lower plate means, said fuel elements supported in said upper plate, means disposed in the space between said upper plate and said lower plate of said core support plate means to divide the space into a plurality of concentric flow zones, said lower plate having a multiplicity of orifices therethrough, a plurality of flow control pipes extending from said flow zones through the lower pressure vessel head, a plurality of plate means disposed between said blanket elements and said pressure vessel to form a thermal shield arrangement, means for introducing supercritical coolant and moderator steam through said inlet nozzle into said space between said blanket support skirt and said pressure vessel for passage upwardly through said blanket elements and said thermal shields and then downwardly through said core elements and said core support plate means, a major portion of said coolant and moderator steam passing through said orifices and then through said conduit forming means to said outlet nozzle, a minor portion of said coolant and moderator steam passing through said flow control pipes, flow control means in said control pipes exterior of said pressure vessel arranged to regulate the flow of coolant and moderator steam through the fuel elements corresponding to the zones in said support plate to maintain the outlet temperature of said steam substantially constant throughout the reactor core cross-section, means for varying the density of said supercritical coolant and moderator steam in said pressure vessel to control reactivity and fertile material absorption by varying the neutron spectrum in the reactor and the leakage of neutrons from the reactor, a nozzle through the upper head of said pressure vessel for the insertion of handling means for said elements, a reactivity regulating rod movably disposed along the vertical central axis of said core, a regulating rod actuator extending through said pressure vessel and connected to the upper end of said regulating rod, a plurality of safety rods movably extending vertically through said core, and safety rod actuator means disposed within said pressure vessel and connected to the lower ends of said safety rods.

15. A nuclear reactor comprising a vertically elongated cylindrical pressure vessel having upper and lower heads, said upper and lower heads integrally joined to said pressure vessel by a strength weld, a plurality of fuel elements arranged within said pressure vessel as a core to undergo a fission-type chain reaction and having an operating neutron spectrum energy level substantially above the thermal neutron level, a plurality of elements containing fertile material arranged as a blanket laterally surrounding said core, the upper and lower ends of said elements forming said core containing fertile material to form an upper and lower blanket for said core, an element support plate means arranged in the lower portion of said pressure vessel, said support plate means being divided into at least two concentric portions, the inner portion constructed and arranged to support the elements forming said core and the outer portion constructed and arranged to support the elements of said blanket laterally surrounding said core, a cylindrical core support skirt extending upwardly from said lower head and integrally connected at its upper end to the outer periphery of said corea support plate means, a cylindrical blanket support skirt extending upwardly from said lower head concentric with said core support skirt and integrally connected at its upper end to the inner periphery of said blanket support plate means, an outlet nozzle extending centrally through the lower head of said pressure vessel, conduit forming means extending from the lower end of said core support skirt into said outlet nozzle, an inlet nozzle extending through the lower portion of said pressure vessel and communicating with the space formed between said pressure vessel and said blanket support skirt, said core portion of said support plate means comprising an upper and lower plate means, said fuel elements supported in said upper plate, means disposed in the space between said upper plate and said lower plate of said core support plate means to divide the space into a plurality of concentric flow zones, said lower plate having a multiplicity of orifices therethrough, 16. A nuclear reactor comprising a vertically elongated cylindrical pressure vessel having upper and lower heads and operating at a pressure above 2000 p.s.i. and a temperature above 700° F., said upper and lower heads integrally joined to said pressure vessel by a strength weld, a plurality of fuel elements arranged within said pressure vessel as a core to undergo a fission-type chain reaction and having an operating neutron spectrum energy level substantially above the thermal neutron level, a plurality of elements containing fertile material arranged as a blanket laterally surrounding said core, the upper and lower ends of said elements forming said core containing fertile material to form an upper and lower blanket for said core, an element support plate means arranged in the lower portion of said pressure vessel, said support plate means being divided into at least two concentric portions, the inner portion constructed and arranged to support the elements forming said core and the outer portion constructed and arranged to support the elements of said blanket laterally surrounding said core, a cylindrical core support skirt extending upwardly from said lower head and integrally connected at its upper end to the outer periphery of said core support plate means, a cylindrical blanket support skirt extending upwardly from said lower head concentric with said core support skirt and integrally connected at its upper end to the inner periphery of said blanket support plate means, an outlet nozzle extending centrally through the lower head of said pressure vessel, conduit forming means extending from the lower end of said core support skirt into said outlet nozzle, an inlet nozzle extending through the lower portion of said pressure vessel and communicating with the space formed between said pressure vessel and said blanket support skirt, said core portion of said support plate means comprising an upper and lower plate means, said fuel elements supported in said upper plate, means disposed in the space between said upper plate and said lower plate of said core support plate means to divide the space into a plurality of concentric flow zones, said lower plate having a multiplicity of orifices therethrough, a plurality of flow control pipes extending from said flow zones through the lower pressure vessel head, a plurality of plate means disposed between said blanket elements and said pressure vessel to form a thermal shield arrangement, means for introducing supercritical coolant and moderator steam through said inlet nozzle into said space between said blanket support skirt and said pressure vessel for passage upwardly through said blanket elements and said thermal shields and then downwardly through said core elements and said core support plate means, a major portion of said coolant and moderator steam passing through said orifices and then through said conduit forming means to said outlet nozzle, a minor portion of said coolant steam passing through said flow control pipes, flow control means in said control pipes exterior of said pressure vessel arranged to regulate the flow of coolant steam through the fuel elements corresponding to the zones in said support plate to maintain the outlet temperature of said steam substantially constant throughout the reactor core cross-section, means for varying the density of said supercritical coolant and moderator steam in said pressure vessel to control reactivity and fertile material absorption by varying the neutron spectrum in the reactor and the leakage of neutrons from the reactor, a nozzle through the upper head of said pressure vessel for the insertion of handling means for said elements, a reactivity regulating rod movably disposed along the vertical central axis of said core, a regulating rod actuator extending through the upper head of said pressure vessel and connected to the upper end of said regulating rod, a plurality of safety rods movably extending vertically through said core, and safety rod actuator means disposed below said core and connected to the lower ends of said safety rods.

References Cited by the Examiner

UNITED STATES PATENTS

| | | | |
|---|---|---|---|
| 2,975,117 | 3/1961 | Zinn | 176—40 |
| 2,990,349 | 6/1961 | Roman | 176—61 |
| 2,992,982 | 7/1961 | Avery | 176—61 |
| 3,060,111 | 10/1962 | Sherman et al. | 176—61 |

FOREIGN PATENTS 749,064   5/1956   Great Britain.

OTHER REFERENCES

Nuclear Power, vol. 6, No. 66, October 1961, page 75.

L. DEWAYNE RUTLEDGE, *Primary Examiner*.

CARL D. QUARFORTH, *Examiner*.